United States Patent [19]

Gilson et al.

[11] Patent Number: 4,470,673
[45] Date of Patent: Sep. 11, 1984

[54] EYEWEAR WITH TRANSLUCENT SUPERIOR FIELD OF VIEW

[75] Inventors: Richard D. Gilson, Columbus; Edgar D. Young, Hilliard, both of Ohio

[73] Assignee: Foggles, Inc., Columbus, Ohio

[21] Appl. No.: 338,270

[22] Filed: Jan. 11, 1982

[51] Int. Cl.$^3$ .............................................. G02C 7/10
[52] U.S. Cl. ...................................... 351/44; 351/163; 351/158
[58] Field of Search ................... 351/41, 44, 45, 46, 351/47, 163, 162, 165; 2/13, 12, 432

[56] References Cited

U.S. PATENT DOCUMENTS 1,706,429  3/1929  Willard ................................. 351/45
3,384,903  5/1968  Malcom ................................. 351/44

*Primary Examiner*—John K. Corbin
*Attorney, Agent, or Firm*—Mueller and Smith

[57] ABSTRACT

System, method and apparatus wherein eyewear is provided particularly suited for use in conjunction with luminescent displays such as visual display terminals and which serves to improve operator performance and reduce asthenopia. The eyewear includes a forward frame portion having a centrally disposed bridge section and right and left temple pieces extending from the frame portion. The frame supports a clear optical region dimensioned for intercepting lines of sight substantially only within the inferior field of view of the user's eyes and a translucent region intercepting and blocking lines of sight directed substantially outwardly from the mid pupillary position of the user's eyes within the superior field of view. Preferably, the clear optical region is pigmented to define an optical filter and this filter preferably is selected having a pigmentation in the yellow portion of the visible spectrum.

11 Claims, 14 Drawing Figures

EYEWEAR WITH TRANSLUCENT SUPERIOR FIELD OF VIEW

BACKGROUND OF THE INVENTION

In 1974, statisticians were observed to be convinced that occupational environments of the future would be associated heavily with the rapidly advancing technology of data recovery and data dissemination. Determinations were made that, by 1980, machine writing would essentially occur through the production of paper copies from image screens associated with computers. In particular, by about 1985, operators in the work force would be positioned at display terminals, for example of the cathode ray tube (CRT) variety as opposed to carrying out clerical duties principally associated with the use and maneuvering of paper documents. Such predictions appear to have been accurate, industry now witnessing the production of publications such as newspapers being carried out through keyboard and visual display terminal (VDT) inputs to computerized print-outs, secretarial duties being carried out before visual displays, drafting, process surveillance and governmental functions all evolving within an environment wherein multitudes of operators sit before visual readout terminals to insert and retrieve information. In addition to conventional cathode ray tube readouts, work also is involved with the studying of projected images, for example evolved through data collected with microfilm or microfiche recordation techniques and the like.

Because of the somewhat intensive nature of the work before these visual displays, it has been opined that this evolution of computerization in society has resulted in what may be considered a movement of working environments earlier termed "white collar" toward "blue collar" or toward an industrial character, while the latter industrial form of employment has acquired more of an office character. In this regard, the reader's attention is directed to the following publication:

I. Gunnarson, E., and Ostberg, 0. *Physical and emotional job environment in a terminal-based data system.* Research report 1977:35, OSHA-78-1535, Dept. for Occupational Safety, Occupational Medical Division, AMMF, 1977.

Generally, the visual display terminal before which the operator is seated comprises a display screen, the more prevelant being a cathode ray tube (CRT), a keyboard and associated terminal electronics. For most installations, alphabetical and numerical characters are generated by select phosphor excitation at the raster of the CRT as a dot matrix, usually developed in a $9 \times 5$ format. The colors generated by these phosphors may vary from a white appearance to various color defining wavelengths, for example, in the green region or orange region. Excitation of CRT phosphors is not steady state in nature but occurs at a predetermined rate, for example, at 40 to 60 scans per second. This intermittency is accommodated by the dwell characteristic of the phosphors which tends to eliminate a flickering effect. Refresh frequencies of character generation should accommodate the critical fusion frequency (CFF) of the operator. The luminance or brightness of the characters generally can be controlled by the operator, however, as luminance is increased, the resolution of the dots becomes diminished. An observed deficiency in character generation at CRT rasters has been associated with a variation in the degree of luminance from the center of the CRT toward the edges. Accordingly, the operator often will not be capable of adjusting the display to achieve a uniform luminance, and thus, uniform readability across a singular given display screen. In connection with the above, the reader's attention is directed to the following publication:

II. *Visual Display Units.* Reference 139/100/2/2. Dept. of Health, Macarthy Trust Bldg., Lambton Quaz, Wellington, New Zealand.

In a survey of visual display terminal operators described in publication I above, it was found that 75 percent of the operators investigated had some visual discomfort in connection with their use of VDTs, 46 percent had severe problems, and 47 percent were observed to have undesirable symptoms which persisted following their work. Similarly, publication II describes a study wherein visual display terminal operators exhibited a significantly higher incidence of asthenopia (eye discomfort) than did a comparison group. These deleterious impedances to the performance and health of VDT operators have become the source of increasing study, as may be evidenced by the following publications:

III. Ward, S.R. *Vision and eye effects of video display devices.* J. Amer-Optom. Ass. 51,731-2, 1980.

IV. Laubli, Th., Hunting, W., and Grandjean, E. *Visual impairments related to environmental conditions in VDU operators.* Dept. of Hygiene and Ergonomics, Swiss Federal Institute of Technology, CH-8092 Zurich, Switzerland.

V. Holler, H., Kundi, M., Schmid, H., Stidl, H.G., Thaler, A., and Winter, N. Arbeitsbeanspruchung and Augenbelastung an Bildschirmgersten, Wien, Verlag des OGB, 1975.

VI. Ostberg, 0., Powell, J., and Blomkvist, A. *Laser optometry in assessment of visual fatigue in VDU operators.* Technical report 1 T, Dept. of Human Work Sciences, Univ. of Lulea, Sweden, 1980.

The above publications consider a variety of observed elements of operator discomfort. For example, subjective eye related problems such as burning sensations, eye muscular fatigue, headaches, itching and eye redness have been reported. Ergonomic related observations have shown other forms of muscular strain to occur, for instance the eyelids of the operator generally are kept open enough to suppress blinking reflexes that occur from time to time and portions of the facial muscles and neck muscles are subjected to the tasks of heavy static holding. Ergonomics broadly is defined as the scientific study of the relationship between man and his working environment.

A number of environmental factors have been determined to contribute to asthenopia, a prominent one being concerned with glare. Glare phenomena are considered to include a broad complex of physiological, psychological and physical factors which combine to determine whether the brightness relationships within a visual environment contribute favorably or unfavorably to seeing conditions. These brightness relationships may influence the visibility of a visual task or their effects may be less obvious and result in decreased ease of seeing. "Direct glare" as is encountered in conjunction with the utilization of visual display terminals generally is caused by viewing an object of low luminance in the presence of considerably higher luminance objects. While a significant reduction in visibility may not be present, nevertheless a feeling a discomfort often is evoked under glare conditions. In this regard, the reader's attention is directed to the following publications:

VII. Guth, S.K. *Discomfort glare.* Amer. J. Optom. and Arch Amer. Acad. Optom. 38,247, 1961.

VIII. *Potential Health Hazards of Video Display Terminals,* U.S. Department of Health and Human Services, DHHS (NIOSH) Publication No. 81-129.

In the environment of the visual display terminal, the operator generally will be assuming what is considered the most comfortable viewing direction which is forward and somewhat downwardly about 15° to 20° below the horizontal plane of the eye. Thus, the viewing screens of VDTs generally are vertically positioned to accommodate this desired angularity with respect to eye station position. The keyboard usually is positioned beneath the screen at a level associated with the position for carrying out manual writing. As the operator looks away from the screen, gaze generally will be somewhat upward to achieve eye relief and this slightly upward vision will encounter overhead or surrounding environment illumination as evolved from bright luminares or outdoor illumination through windows and the like. Measurements have shown that the luminances of objects encountered in such viewing are anywhere from 60 to 500 times greater than screen luminance. These luminance ratios exceed those beyond which discomfort is caused and also exceed the recommended standards of the American National Standards Institute. In connection with the above, the reader's attention is directed to publications IV and VII above as well as to the following publications:

IX. Luckiesch, J., and Guth, S.K. *Brightness in the visual field at borderline between comfort and discomfort.* Illuminating Engineering 44,650, 1949.

X. *American National Standard Practice for Office Lighting.* American National Standards Institute. New York, 1973.

Glare also can be occasioned by reflections off of the keyboard or other implements that are in the vicinity of the visual display terminal. Suggestions have been made that the luminance ratio in the central field of vision of the operators be reduced, for example, below 1:3 and a variety of approaches have been used to create a less distracting and less stressful visual environment. For example, overhead luminares have been shielded or utilized with diffusers. Windows have been covered with venetian blinds and the general level of overhead lighting has been lowered. In some instances, polarization filters, micromesh filters or color filters have been positioned in front of the viewing screen to minimize glare. However, such interpositioning has resulted in less than a desirable result. In certain instances, a thin film interference layer has been positioned over the surface of the viewing screens to reduce reflectivity. Further, hoods have been positioned on the screens. However, where the latter approach is made, working posture becomes restricted and adverse anthropometric factors enter into consideration.

The movement of gaze on the part of the operator to a brighter surround following a period of working observation directed into the viewing screen also contributes to asthenopia because of the transient adaptation effects encountered. Whenever the eyes' gaze is changed to an object of different illuminance level, a period of time is required to adapt to that luminance level. The greater this difference in luminance or luminance ratio, the longer the operator will take to adapt. Repeated over a working interval, such adaptation requirements can lead to decreased visual efficiency and ocular fatigue.

Another aspect contributing to asthenopia in conjunction with VDT operators is concerned with the concentration of the gaze of the operator upon the viewing screen which gaze will take place under conditions of an eye station to screen distance of between about 40 and 100 centimeters (see publication I above). In order to observe the characters at the screen within this range, the eye of the operator must focus or accommodate and properly converge. This involves the contraction of a muscle (the ciliary body) in the eye which evokes a change in the shape of the crystalline eye lens. Studies have shown that, after two hours of work on the part of an operator at a VDT, the eye becomes underaccommodated for the near working distance. This results in a blurring of near objects. When the worker than looks at a distant object, accommodation is not completely relaxed and the operator remains over accommodated. Such an effect results in distance blur and, additionally, evokes accommodative fatigue. In the above regard, see publications V and VI (supra).

As is apparent, an important factor involved in the development of VDT operator asthenopia is generated in consequence of the relatively high degree of task concentration demanded. Distractions such as visual as well as aural in the vicinity of the operator's immediate environment should be avoided. To this end, VDT installations may be found located within small cubicles or carrels often not appreciated by operators due to a cabin effect. Similarly, hoods or some form of peripheral blinder might be worn by the operators. However, such opaque occlusion of the superior field of view to effect concentration at the inferior field of view generates intolerable confining or claustrophobic reactions.

VDT terminals also are being located within environments other than typically associated with offices. For example, in many instances the terminals are located directly within a factory or manufacturing environment. Not only are the lighting conditions generally less than satisfactory within such environments, particularly for carrying out efficient VDT operations, but also the aspects of environmental safety take on an important role. Usually, within such factory environments, operators are required to wear some form of safety eyewear. In many instances, the requirement for such eyewear militates against solutions to reducing asthenopia occasioned by performance before a VDT terminal. As indicated above, distractions which may be visual as well as aural should be accommodated for in the region of VDT operation. Avoidance of such visual distraction finds particular application in schools, inasmuch as concentration on subject matter within the school environment can be broken by the distractions of others and can be interfered with by bright sunlight or flickering overhead lights within classrooms. Additionally, although the legibility of reading material may not be affected under present conditions, future classroom student performance utilizing VDTs is inevitable and similar problems to those discussed above in conjunction with adult working environments will be encountered in the educational environment. Further, testing in crowded classrooms often has created security problems for testing monitors.

To the present time, approaches to reducing asthenopia evoked in the VDT occupational environment have been less than satisfactory. In some instances, employee representative organizations have requested relief to the extent of permitting employees one hour of relaxation away from the display screens following each hour of positioning before the screens. A practical and effective development is needed to accommodate this occupational visual impairment in view of the significantly expanding character of data processing and electronic data utilization.

SUMMARY

The present invention is addressed to a method and apparatus for reducing asthenopia developed by operators of visual display terminals. Further, the eyewear apparatus of the invention finds important application in controlling veiling, retinal illuminance to achieve improved visual acuity in contrast in the imaging of given targets in image space, the use finding value both in conjunction with VDT applications, automotive and aircraft operations and the like.

Another object of the invention is to provide eyewear having a forward frame portion with a centrally disposed bridge section and right and left temple pieces extending therefrom. The frame portion is locatable upon the head of a user before the position of the eyes thereof and supports a clear optical region dimensioned for intercepting lines of sight substantially only within the inferior field of view of the user's eyes and the frame portion further supports a translucent region intercepting and blocking lines of sight directed substantially upwardly from the mid pupillary position of the user's eyes within the superior field of view of those eyes. The clear optical region may be pigmented to define an optical filter of predetermined transmittance.

Another feature and object of the invention provides a system for improving visual display terminal operator performance in the presence of overhead environmental illumination which includes a work station employing a visual display terminal having a luminescent display surface located a viewing or operational distance from the eye position of the operator. Eyewear is providing having a frame portion removably positioned before the eye position of the operator and this frame portion supports a clear optical region having an area extent for intercepting lines of sight substantially only below the mid pupillary location of the eye position. The frame portion further supports a translucent region extending substantially upwardly from the mid pupillary location and within the superior field of view of the eye position. The system further may include an arrangement wherein the eyewear frame portion supports right and left translucent side shields extensible rearwardly from opposite sides of the frame portion and which are configured for occluding peripheral vision at least within the superior field of view. The system further may provide eyewear including a top translucent shield portion extending from the uppermost portion of the translucent region of the eyewear frame to a position adjacent the forehead of the operator which serves to intercept overhead illumination.

As another object of the invention, a system as above described is provided wherein the frame supported clear optical region is pigmented to define an optical filter of predetermined spectral transmission. This pigmentation preferably may be provided to define a yellow filter. Further, the system as above described may be provided wherein the optical region is selected to block wavelengths of the visible spectrum extending substantially to the invisible spectrum from a predetermined wavelength value selected with respect to the display surface luminance.

Another object of the invention is to provide a method for reducing asthenopia of a subject observing a luminescent display located an operative distance from the eye position of the subject and within an environment of overhead illumination. The method includes the steps of placing eyewear over the eyes of the subject and this eyewear is provided having a clear optical region of one area extent for intercepting lines of sight substantially only below the mid pupillary location of the subject's eye position and a translucent region extending substantially upwardly from the mid pupillary location and configured for intercepting light within the superior field of view of the eye position. The method further may provide the clear optical region as an optical filter, the pigmentation which is selected from the yellow visible spectrum.

The invention further provides improved method and apparatus for shielding the eye from high brightness sources such as the sun both by minimizing veiling luminance at the retina and by affording the user an opportunity to comfortably "track" such glare sources and thus avoid luminance conditions otherwise disabling vision capability.

Other objects of the invention will, in part, be obvious and will, in part, appear hereinafter. The invention, accordingly, comprise the apparatus, system and method possessing the construction, combination of elements, arrangement of parts and steps which are exemplified in the following detailed disclosure.

For a fuller understanding of the nature and objects of the invention, reference should be had to the following detailed description taken in connection with the accompanying drawings.

DETAILED DESCRIPTION

Figure 1:
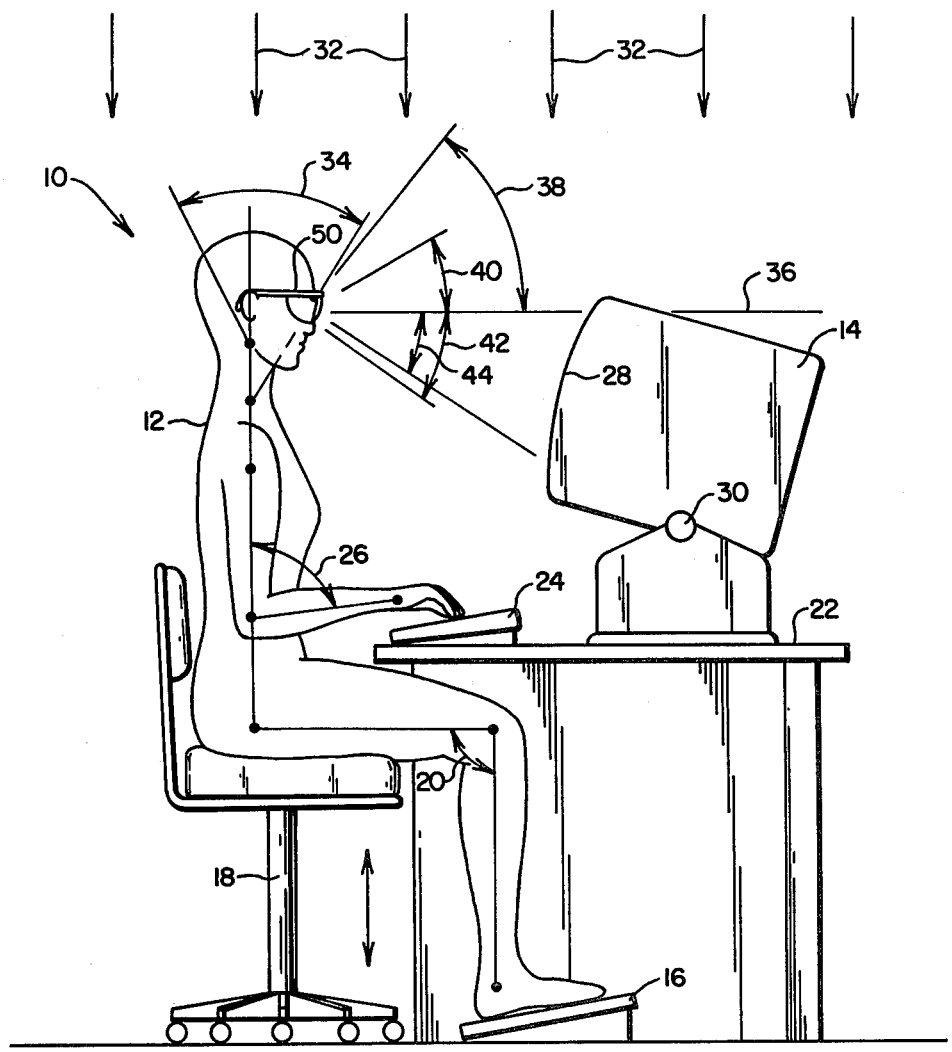
FIG. 1 is a schematic representation of a VDT work station showing operator and positioning of overhead lighting.
Figure 2:
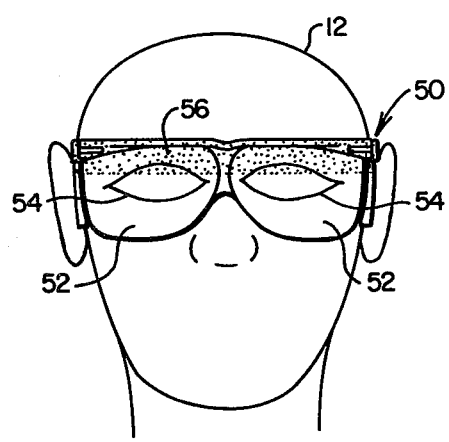
FIG. 2 is a frontal view of the head of the operator shown in FIG. 1.

Referring to FIG. 1, a schematic ergonomic drawing of a work station is represented generally at 10. Work station 10 associates a human operator 12 within a working environment with a visual display terminal (VDT) 14. The operator 12 should be supported and operate within a facilities support geometry which serves to reduce musculoskeletal fatigue as much as possible, for example, designed to minimize the static loading imposed upon operator 12 due to postural aspects. In this regard, the foot of the operator 12 is supported upon an angular platform 16, as the operator sits upon a chair 18 having a five-point base. This chair 18 is adjustable so that the popliteal height is accommodated for and the angle at the knee represented at 20 is preferably slightly greater than 90°. The operator sits before a desk surface 22 having a height which has been determined to preferably be fixed at 720 mm. Surface 22 supports a keyboard 24 which has a home row placement at a height of about 720–750 mm to optimize operator comfort, it being desired that the working position of the arm of operator 12 be at an angle greater than or equal to 90° as represented by angle 26. The screen region 28 of VDU 14 may be adjusted for angularity by a pivot mounting, for example represented at 30. Above the operator 12, the work station generally is provided with overhead illumination as represented by arrows 32.

Thus seated, the operator 12 generally will be capable of experiencing comfortable head movement about the arc 34, a latitude of movement representing 30° about dual pivots along the center line of the torso. The operator 12 may be considered to have a standard sight line (SSL) 36 extending horizontally from the mid pupillary position of the eyes and from this horizontal standard, will have a visual limit of about 50° upwardly, representing the superior field of view as indicated at angle 38. Correspondingly, the lower visual limit from the posture shown will extend downwardly about 70°–80° from SSL 36 to represent an inferior field of view. For the instant discourse, this angular extent need not be displayed. Additionally shown in the drawing are the arcs of maximum eye rotation, for example, that extending into the superior field of view being about 25° as represented by arc 40 and that looking to the inferior field of view being represented by an arc of about 35° as represented at 42. Investigators have determined that the more comfortable positioning of VDT screen 28 with respect to the eye position of the operator provides for observation of screen 28 within an arc of about 10°–30° beneath the SSL line 36 as represented by arc 44. Further, the viewing distance from the operator 12 eye position to screen 28 generally will be about 40–100 cm. (See publication I above.)

Station 10 represents an incompatibility of lighting requirements where, as is the usually encountered situation, visual tasks requiring different illumination occur in the same work arena. For example, the operator 12 generally is called upon to read printed matter, for example at surface 22 or in an elevated document holder. Higher levels of illumination, for example in the range of about 1,000–1,600 lux are desirable for such visual tasks. On the other hand, relatively low illumination levels, for example, in the range of 300–500 lux, are more appropriate for use in conjuction with the observation of the display surface 28 of VDT 14. Thus, where the overhead illumination represented by arrows 32 is made adequate for reading printed matter, the resultant lighting militates against the desired contrast which may be achieved at screen 28. As is discussed in more detail later herein, an important reason for loss of contrast lies in the presence of veiling illumination generated by the higher brightness level overhead lighting. Additionally, such veiling illumination at the retina of the operator's eye may be generated by bright vertical wall surfaces or sun transmitted through windows. Generally, the use of a common filter as may be achieved through wearing sunglasses or the like will not improve the contrast but only lower overall environmental lighting levels by carrying out a simple transmission reduction. Where the overhead lighting represented by arrows 32 is lowered to levels desirable for optimum contrast at screen 28, there results a difficulty of readability of printed matter at the work station.

A solution to this incompatibility predicated upon the use of localized illumination at the work station 10 reimposes the development of asthenopia because of the periodic requirement for the eyes of operator 12 to alternately adapt to high and low luminance levels. Recall that, whenever the eye's gaze is changed to an object of different luminance level, a period of time is required to adapt to that luminance level and the greater the difference in luminance or luminance ratio, the longer operator 12 will take to adapt. Repetition as is required of such adaptation can lead to poor visual performance and ocular fatigue.

Notwithstanding the degree of luminance provided overhead as represented by arrows 32, where fluorescent illumination is provided, a flicker often is encountered which causes discomfort to operators as at 12 contributing to asthenopia and lowering operator efficiency.

Figure 3:
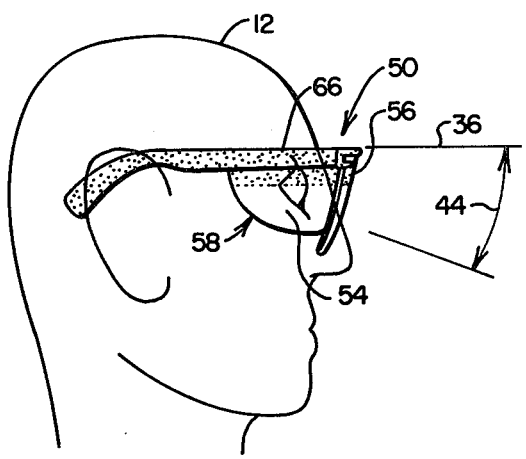
FIG. 3 is a side view of the operator shown in FIG. 1.
Figure 4A:
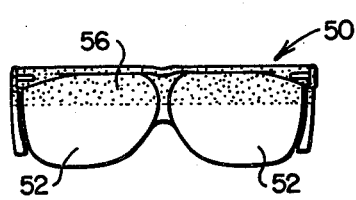
FIGS. 4A–4C show, respectively, front elevational, side-elevational, and top views of eyeglasses worn by the operator as shown in FIGS. 2 and 3.
Figure 4B:
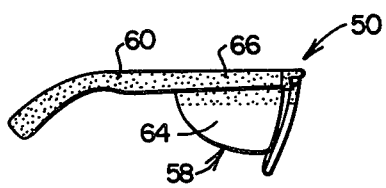
Figure 4C:
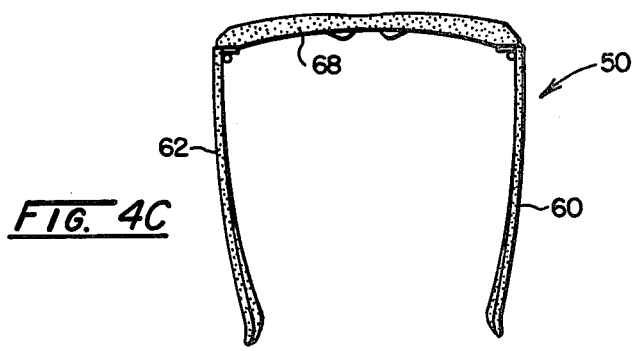

FIG. 1 reveals that the operator 12 is wearing eyeglasses or spectacles represented generally at 50. Eyewear 50 is structured so as to minimize the conditions otherwise evoking asthenopia with respect to operators as at 12 working at tasks within work station 10. Referring additionally to FIG. 2, 3, and 4A–4C, eyeglasses 50 are shown to have a clear optical region or portions 52 confronting the eye positions 54 of subject 12. FIG. 3 reveals that these clear portions through which the subject 12 may view screen 28 extend substantially from the mid or pupillary position of the eye position 54, i.e. from SSL 36 downwardly, so as to intercept vision within the inferior field of view represented earlier by arc 42, which arc again is reproduced in FIG. 3. However, above the mid eye position or SST line 36, the eyeglasses 50 are not clear for vision therethrough but their forward frame portion is fashioned having a translucent region extending thereacross as represented at 56. This translucent region intercepts the superior field of view and, thus, substantially reduces the glare occasioned from overhead lighting, as represented at arrows 32 in FIG. 1 or emanating from other elevated sources. FIGS. 3 and 4A further reveal that eyeglasses 50 are configured having right and left side shield portions, the right one of which is shown at 58 extending rearwardly from the forward frame portion extending downwardly from right temple piece 60, the latter being further represented in FIGS. 4A and 4C. A left temple piece 62 which carries an identical side shield assembly is shown in FIG. 4C. As shown in FIG. 4B, each of the side shields, such as right side shield 58, contains a clear region or portion 64 extending downwardly from the mid pupillary region or from SST line 36 or a horizontal plane extending therethrough and further incorporates a translucent region as at 66 extending upwardly from a border with clear region 64. FIG. 4C further reveals an inwardly directed flange 68, which preferably also is translucent, which extends from the outwardly disposed periphery of the lenses of glasses 50 towards the forehead of the subject 12 for the purpose of improving the interception and diminution of glare generated by overhead illumination. To further improve glare control, the right and left side shields are configured to slightly overlap the forward frame portion of eyewear 50 at the hinged union of temple pieces 60 and 62 therewith. This provides a form of seal against "glare leaks" which otherwise may be encountered.

With the arrangement thus shown, a translucent region is positioned about the operator 12's eyes so as to block vision within the superior field of view while, at the same time, providing a sufficient diffuse luminance effect to avoid a "blinder" feeling which otherwise would be encountered should the translucent regions be formed of opaque materials. By providing for this translucency any claustrophobiclike reaction on the part of the operator 12 is minimized. Further, the translucency provides a sufficient degree of light diffusion about the upwardly disposed region of eyewear 50 such that flicker which may be encountered from overhead fluorescent lighting is, in effect, averaged out by light diffusion and the operator does not encounter visual difficulties as a result thereof. However, the important advantage which the translucent regions serve is that discomfort glare from bright objects in the superior field of view is eliminated. Recall that this discomfort glare is caused by viewing an object of lower luminance in the presence of considerably higher luminance objects in the field of view. In the case of viewing the VDT screen 28, generally brighter characters are presented on a darker background and the minimization of the glare within the superior field of view thus improves operator eye comfort. As noted above and as discussed in more detail in conjunction with FIGS. 6A–6F, the avoidance of discomfort glare through the shielding effect derived by the translucent regions of eyewear 50 also serves to minimize veiling illuminance at the retina of the operator 12. As a consequence of significantly lowering such veiling illuminance, the contrast which may be achieved by operator 12 in identifying visual targets, for example, at screen 28 may be enhanced and the utilization of filters reducing the transmission of light energy may be employed with unusually improved effectiveness both in terms of eye comfort and improved acuity of character recognition.

Eliminating the superior field view through the utilization of the translucent region of eyeglasses 50 also serves to improve visual performance of operator 12 by reducing transient adaptation effects. In this regard, whenever the eye's gaze is changed from an object of one luminance level to an object of a different luminance level, a period of time is required for adaptation to the second luminance level. The greater the difference in these luminance levels, the longer the eye requires to effect this adaptation. The sensitivity of the eye to detect detail and this visual performance are maximized when the eye is properly adapted to the luminance level at which it is looking. The reader's attention in this regard is directed to the following publication:

XI. An Analytic Model for Describing the Influence of Lighting Parameters upon Visual Performance. Publication CIE No. 19/2 (TC-31) 1981, Bureau of Central DeLa CIE. 52 Boulevard Malesherbes, 75008, Paris, France.

With the superior field of view reduced through the use of a translucent region within eyeglasses 50, the VDT operator 12 will not look at high luminance objects in the higher luminance field and transient adaptation effects will be reduced to enhance visual performance.

An added benefit is achieved through the translucent blocking of vision within the superior field of view of operator 12. For the most part, VDT operators 12 perform in working environments wherein many work stations are positioned in mutual adjacency within a common room or environment. By eliminating the superior field of view, a great number of the common visual distractions encountered under such working conditions are eliminated from the operator's field of view, thus resulting in improved performance or productivity.

Figure 5A:
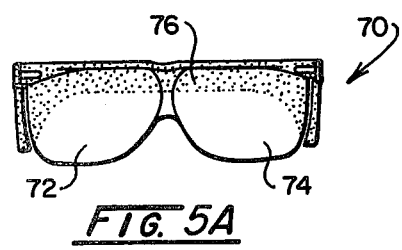
FIGS. 5A–5B, respectively, show front elevational and one side-elevational view of another embodiment of eyeglasses which may be worn by the operator shown in FIG. 1.
Figure 5B:
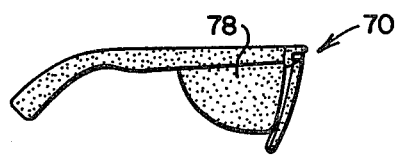

Referring to FIGS. 5A and 5B, an embodiment for eyewear according to the instant invention is shown at 70 which includes clear optical portions 72 and 74 surmounted by fowardly disposed translucent region 76. Additionally, each of the side shield portions of the eyeglasses of embodiment 70 is entirely translucent, for example, as is represented by right side shield 78 in FIG. 5B. With the configuration thus shown, not only is the superior field of view rendered translucent, but the peripheral viewing capability of the operator is considerably restricted to enhance the minimization of operator visual distraction. Some operators prefer this enhanced occlusion of peripheral vision while others will find it overly confining. The eyewear embodiment as shown at 70 also will be observed to improve the concentration by school pupils upon reading and test materials and can pose a difficulty to those pupils predisposed to looking elsewhere for answers. Any view toward another test/answer would require an obvious turn of the head inasmuch as sideways glances are ineffective. Of particular importance, however, the use of eyewear as disclosed within the school environment serves to provide an avoidance of distraction without imposing the above-mentioned cabin effect as caused by carrels or through the use of opaque blinders or the like. Students using the eyewear are comfortable and experience no claustrophobic effects and thus have the opportunity to provide a higher concentration upon studies.

Several methods may be employed for creating the translucent regions upon eyewear 50. One method is to roughen the surface by sandblasting or other similar technique. Another method is to coat the region with a coating composition containing an opacifying pigment in a proportion adequate to create translucency. Appropriate opacifying pigments include, for example, pigmentary titanium dioxide, magnesium carbonate, polystyrene beads and similar plastic pigment, and like opacifying pigments. Additionally, the opacification can arise from use of incompatible resin phases as is conventional, e.g. an epoxy resin and an acrylic resin, a styrene latex and an acrylic latex, and other known incompatible phase resins for creating partial opacification or translucency. A further method is to employ gloss control of a coating wherein inorganic pigments contained within the coating composition are of an average particle size diameter about the same or greater than the coating thickness to be employed so as to create a nonuniform or rough surface. Appropriate refraction can be achieved thereby for creating the translucent region. Silica, alumina, and like pigments are conventional for this purpose as well as for imparting increased abrasion resistance to the substrate being coated.

Binders for such coating compositions preferably are acrylic resins which may be thermoplastic, thermosetting, ultra-violet radiation curable and similar materials. Additional conventional binders include, for example, polyester resins, urethanes (either 2-pack or 1-pack urethane systems), clear epoxy resins, and the like. Such coating compositions may be aqueous, non-aqueous, or even in powder form. The particular coating system employed is conventional designed to achieve the stated purpose of providing a translucent region.

Yet another method for creating the translucent region is by creating internal stress fractures within the polycarbonate or other material from which the glasses are formed. Beside apparent physical internal stress fracture which may be created, use of a solvent to create such internal stress fractures (e.g., methylene chloride, polyethylene oxide or a soap in water, or the like) may be used as is necessary, desirable, or the convenient. Likely, additional methods for achieving the translucent region may be conceived and certainly are within the scope of the present invention.

While improvement in the performance of operators as at 12 is achieved through eyewear structured as shown at 50 or 70, still improved performance is achieved by forming the optical regions 52 or 72 and 74 of a selectively pigmented clear material. For example, where the typically encountered VDT screen 28 images are formed of white alpha-numeric characters in combination with a gray or darker background, then it is preferred that the pigmentation of the optical regions be selected from the mid spectrum and preferably in the yellow region. In effect, for this preferred arrangement, a yellow filter is incorporated within the optical portion 52 and this is carried out to enhance image clarity at the VDT screen 28 and consequent improved operator 12 comfort. Several aspects are involved in the utilization of such filter optics at optical region 52. For example, the human eye exhibits a considerable amount of chromatic aberration. Chromatic aberration is a phenomenon associated with spectral light wherein the eye will provide a focus position for a given object depending upon the wavelength of broad spectrum light coming from the object to be focused. Inasmuch as in normal viewing situation, the image of any given object is composed of a variety of wavelengths, essentially only one such wavelength can be focused precisely at the retina. All others will be focused at some focal position in front of or behind the retina, resulting in blur on the retina. The farther any given wavelength is from that focused at the retina, the more blurred is its image.

Now considering the sensitivity of the eye with respect to the spectral distribution of light impinging upon it from image space, it has been determined that the eye responds in terms of wavelength in somewhat of a Gaussian or bell-shape distribution of wavelengths of the visible spectrum, the peak of this distribution being at the 555 nm wavelength position. Thus, any filtering removing certain aspects of the broad spectrum wavelength emanating from a target will represent, in effect, a multiplication of the transmission characteristics of the filter with respect to wavelength times the eye sensitivity distribution. By eliminating through filtering, for example, that portion of the visible spectrum extending upwardly toward longer wavelengths or extending downwardly in terms of wavelength from some predetermined mean value, then the eye will be required to focus only those remaining wavelengths of the image spectrum and the sensitivity of the eye will adjust to effect a focusing at a new mean value generally adjacent the spectral characteristic of the filter being utilized. For example, where a yellow filter is utilized, then the optimum focus achieved by the eye due to its sensitivity distribution will be somewhere in that same yellow region. The spectral sensitivity curve for the human eye has been standardized by the Commission Internationale de l'Eclairage. For a further discourse concerning such sensitivity, reference is made to the following publication:

XII. Emsley, H.H. *Visual Optics.* Vol. 1, Fifth Ed. Butterworths, Boston, 1953.

For the most often encountered embodiment, a filter for optical region 52 (and clear side shield regions as described at 64) in the yellow region will serve to absorb short wavelengths of light, for example in the blue region while transmitting the longer wavelengths thereof, i.e. green through red. When a white object such as the characters at VDT screen 28 are viewed by operator 12, the yellow filtering optical region 52 will serve to reduce the amount of chromatic aberration by eliminating certain of the wavelengths which are the most out of focus. In effect, the yellow filter region 52 will serve to enhance the clarity of the white characters. An important phenomena observed with the utilization of a yellow filter at optical region 52 is psychological in effect. When the operators place the yellow filter eyeglasses 50 over their eyes the working station region appears to them to become brighter and thus, viewing becomes more comfortable. It is opined that this effect stems from the psychophysical aspects of terrestrial humans to react to light incorporating high yellow content as an indication of daylight as opposed to reacting to light having a high blue spectral content as indicating light of the evening. For most operators thus far tested, the effect of the yellow spectral filtering represents an important aid, the characters at VDT screen 28 appearing more clear and crisp and the illuminational surroundings appearing brighter and more pleasant.

Where the character coloration or object targets at screen 28 vary from white towards other regions of the spectrum, then the selection of pigmentation for optical region 52 will vary in complement therewith. Generally, it is desirable to filter so as to block the "outward" region of wavelengths extending from a targeted filter wavelength in a manner effecting a restriction of the amount of chromatic aberration. Filter selections will depend upon the color of the phosphor of the screen. It is important to transmit the color of the phosphor so as not to diminish its brightness as perceived by the worker. It also is important to filter out wavelengths distant from the color of the phosphor in order to reduce chromatic aberration as discussed. Also, by selectively transmitting the wavelength of the phosphor, the brightness of the phosphor is not reduced whereas the perceived brightness of other objects in the field of view is reduced since many of the wavelengths coming from these objects are attenuated. This further reduces the effects of discomfort glare, disability glare, and transient adaptation as previously discussed; thereby increasing visual performance and decreasing ocular fatigue.

While the structure of eyeglasses 50 thus described has been found to improve operator performance and lower the occasion of asthenopia, still further improvement may be achieved for many work station environments. As indicated earlier herein, operators 12 of VDT stations 10, generally view screens 28 at distances between 40 and 100 centimeters. In order to achieve clarity of vision at a given distance within this range, the eye of operator 12 must accommodate or carry out a focusing activity. As is well known, when a subject changes visual fixation from a distant object or target to a nearer object, there occurs a neurological triad response. This triad is considered to be accommodation, accommodative convergence and miosis and these three responses are under the control of a common neurological center (the third cranial nerve complex) and necessarily occur together. For accommodation, the ciliary muscle within the eye contracts, thus causing the crystalline lens to decrease its diameter and to increase its anterior-posterior size. This results in a greater refractive power for the lens and therefore for the optical system of the eye in toto. Such an ability to change focus is necessary in order to obtain a clear retinal image for objects at different viewing distances from the eye. Accommodation is considered to be the "driver" of the near triad response.

The second component of the neurological triad, accommodative convergence, considers the supply of innervation to the medial rectus muscle of each eye which cause the eyes to turn inward, i.e. towards each other or to converge. This convergence will occur even in the absence of binocular stimulation and the difference between the convergent position of the eye attained through accommodative convergence and the convergent position required to attain binocular alignment is conventionally referred to as the "near phoria". Fusional vergence is used to properly align the eyes under binocular conditions or to overcome phoria. The final or third component of the near triad response is miosis or pupillary constriction. The "purpose" of this would appear to be that of increasing the depth of focus of the eye, thereby decreasing the amount of accommodation required to obtain a clear image of a near object.

With the above in mind, as the operator 12 views screen 28 at the given eye position to screen distance, the ciliary body within the eye changes the shape of the crystalline lens. Studies as described at publications V and VI have shown that after two hours of work at such stations as at 10, the eye of operator 12 becomes underaccommodated for the near working distance. This results in a blurring of near objects. Physiologically, the ciliary body will have remained in a contracted position for an extended period. In effect, it becomes spastic in that position. When the operator 12 then looks at a distant object, accommodation is not completely relaxed and the operator remains over-accommodated with concomitant distance blur.

Where desired by the user, optical region 52 may be provided having a relatively low plus power selected below about one diopter, i.e. about 0.50 to 0.75 diopter to enable operator 12 to focus on the screen without needing the extent of accommodation otherwise required where optical region 52 is piano in nature. This serves to reduce or eliminate blur that occurs at both distance and near viewing as a result of long periods of near work as typically are encountered at work stations 12, i.e. the ciliary body is not continuously contracted. In accordance with accepted definitions, one diopter generally is defined as the refractive power necessary to focus parallel light rays at one meter. This means that with the ciliary body completely relaxed, targets at one meter distance from the subject will be properly focused without contraction of the ciliary body. In effect, the plus refractive power provided within optical region 52 is one selected to reduce the amount of ciliary contraction required to perform at the desired working distance, i.e. the distance from operator 12's eye position to screen 28.

Where operators 12 are of higher age, they will tend to lose their ability to accommodate, a condition referred to as presbyopia. Conditions of presbyopia necessitate the use of plus lenses in the form of reading glasses or bifocals in order to see clearly at near working distances. Thus individuals who experience presbyopia, i.e. those of about 40 years of age and above will require that the optical regions 52 be of a professionally prescribed nature.

The plus lens characteristic of optical region 52 will provide a small amount of magnification to improve visual efficiency. In this regard, the reader's attention is directed to the following publication:

XIII. Borish, I.M. *Clinical Refraction,* Third Ed. Professional Press, Inc., Chicago, 1970.

In the course of developing the apparatus and technique of the instant invention, and the testing of embodiments of eyeglasses structured as at 50 having plano optical regions 52 and various pigmentations, it has been discovered that the eyeglasses 50 have a significant utilization as a form of sunglasses. In this regard, the eyeglasses 50 serve to render translucent the superior field of view as described above. By providing the translucent regions as at 56 and 66 above the mid pupillary position, the superior field of view is effectively blocked while adequate vision for normal activity is retained. It is observed that this blocking serves to eliminate the veiling luminance at the retina generated by a bright overhead environment. When such blockage occurs, the filtration effect through regions 52 normally achieved by sunglasses is enchanced in terms of object target definition or visual acuity. This phenomenon is recognized for work station 10 embodiments, as well as in conjunction with sunglass structures, as is discussed with the schematic representations of FIGS. 6A-6F.

Veiling luminance is a condition which obtains due to the structuring of the human eye system. This optical system is not entirely perfect and, due to various forms of imperfections which can occur in its development, a light scattering effect will be developed which serves to cause a distribution of glare generated illuminance across the retina. Recalling that the image of a target in image space at which one is looking is imaged on the fovea of the eye, this foveal region during such focusing also may be affected by veiling luminance occasioned by glare conditions which develop at peripheral regions of the retina and evoke a light energy distribution which overlaps the fovea. The resultant condition in terms of human vision is one wherein the overall illuminance at the fovea is elevated and the contrast which operates to achieve acuity of image is deleteriously affected.

Figure 6A:
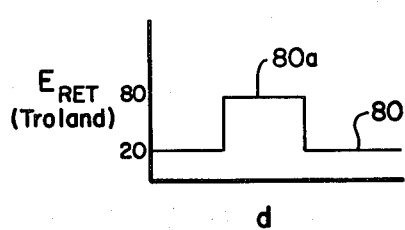
FIGS. 6A–6F show schematic representations of a line profile of illuminance energy characteristics across a retina representing a given target under conditions of veiling luminance, superior view blockage and filtration.

FIG. 6A shows a profile 80 of a line across the retina including the position of a target image portion 80a which would be in the fovea region. The figure relates the illuminance at the retina, for example in Troland units with respect to distance across the retina. Note that the underlying illuminance has a value of 20 Trolands, while the image itself at 80a exhibits a retinal illumination of value 80 Trolands. Looking to FIG. 6B, the effect of a glare source in creating a veiling luminance is represented by profile 82. The peripherally originated glare source is represented at 82a and the profile 82 is shown to represent a veiling illuminance which scatters about the retina overlapping the fovea and having an energy value of 80 Trolands.

Figure 6B:
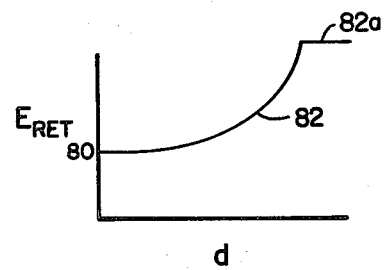
Figure 6C:
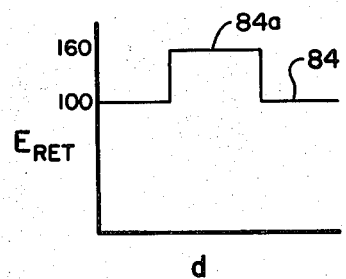
Figure 6D:
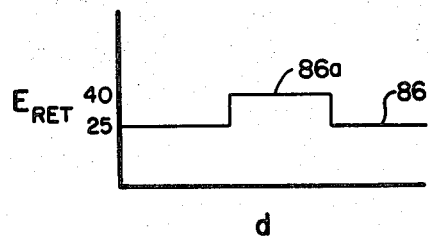

Considering now the effect of veiling illuminance as represented at profile 82 in FIG. 6B on the imaging of a target 80a as represented at FIG. 6A, a summation occurs which is represented at FIG. 6C. In this instance, the underlying illuminance now reaches a value of energy at the retina of 100 Trolands as represented by profile line 84, while the target at 84a in the region of the fovea has a retinal illuminance energy of 160 Trolands.

Looking to the effect of the veiling illumination on the contrast perceived by the eye, it may be observed that contrast is a relationship of the luminance of the target, $L_T$, minus the luminance of the background, $L_B$, divided by the luminance of the background. The luminances of the target, $L_T$, and background, $L_B$, in object space are directly related to the corresponding retinal illuminances in image space. Accordingly, the contrast, C, for the conditions obtained at FIG. 6C will be $C=(160-100)/100=0.6$.

Now consider the utilization of conventional sunglasses or simple filtering before the eye. In this condition, consider that a given filter before the eyes for the condition at FIG. 6C provides for a transmission of 25 percent. The result shows a profile 86 having a target definition at the fovea represented at 86a. This target 86a will have a maximum luminance at the fovea of 40 Troland, while the background illumination will be reduced to 25 Troland. Utilizing the same considerations for determining contrast, it will be observed that the resultant contrast, C, equals $(40-25)/25=0.6$. Note from this calculation, that no improvement in contrast is achieved through the utilization of simple filters or sunglasses.

Figure 6E:
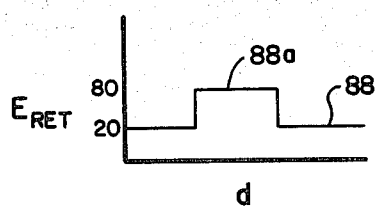
Figure 6F:
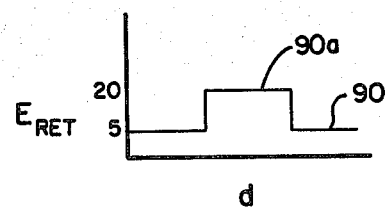

Now looking to FIG. 6E, the results achieved through the elimination of veiling luminance may be observed. Note in this case, that profile 88 shows that the target has a retinal luminance energy of 80 Troland as represented at 88a, while the background retinal luminance has returned to a value of 20 Troland. In effect, the illumination conditions have returned to those represented at FIG. 6A. The contrast, C, equals $(80-20)/20=3.0$. Where a simple filter is positioned before the eyes in conjunction with the elimination of veiling luminance as is substantially achieved with the translucence of the eyewear 50, a 25 percent transmission reduction provides the luminance profile represented at 90. It may be observed, that the target, now represented at 90a has a retinal luminance energy of 20 Troland, while the background luminance has dropped to 5 Troland. The resultant contrast, $C=(20-5)/5=3.0$. As is apparent, the contrast has returned to that initially achieved as represented at FIGS. 6A and 6E, while overall luminance has been diminished to the comfort of the operator.

Where eyeglasses are structured as described above at 50 utilizing plano optical regions 52, veiling luminance is essentially blocked and, as represented at profile 90 in FIG. 6F, overall luminance is diminished, and target definition is retained with a lesser dimunition of contrast. Thus, the desired effect evoked from sunglasses is achieved with an improvement in image acuity as perceived by the wearer of the glasses 50.

Still another discovery was made in the course of testing glasses as above described in connection with FIGS. 6A-6F and that occured in conjunction with the utilization of the eyeglasses 50 in the course of driving during conditions of low sun typically encountered in the eastern United States in mid and late fall and early winter. During these seasonal periods in those regions, the almost parallel rays of the sun tend to blind drivers, notwithstanding their use of opaque pivotal visors purporting to block such rays as well as sunglasses. In effect, these opaque visors and sunglasses are of little value under many blinding glare conditions which are encountered and which are the cause of numerous automotive accidents. When eyewear as at 50 utilized as sunglasses are provided the drivers, the drivers have an immediate awareness of the position of the sun, inasmuch as it is represented to the wearer of the eyeglasses as a small disc of discernible illuminance within the translucent regions as at 56 and 66. The operator is thus continually aware of the exact position of the sun and will not be blinded in surprise as the rays of the sun fall, for example, beneath an opaque blinder as represented by typical visors. Eyeglasses, thus used as driving sunglasses, have been found to represent a significant improvement in terms of driving safety. The eyewear also has been found to represent a significant visual aid to aircraft pilots, their visual comfort being considerably enhanced and flying safety improved. In the latter regard, encountering a disability glare from the sun during such critical periods as occur during landing and the like represents a highly hazardous condition. By being able to "track" the sun position while retaining full, non-glare visual curing for landing purposes, the pilot may carry out necessary maneuvers with enhanced safety.

Generally it has been found desirable to employ non-spectral pigmentation where the glasses 50 are utilized as sunglasses. In this regard, grays or browns have been preferred as opposed to green tinted glasses. The green tinted glasses tend to evoke an overdarkening reaction in the mind of the user. Where yellow tinted glasses 50 with plano optical regions 52 have been utilized for driving purposes in the waning hours of the day, i.e. at dusk, the operators have been observed to enjoy a lowering of eye fatigue and more driving comfort. In particular, the earlier noted psychological phenomenon of enhanced brightness as well as the improvement in visual target acuity leads to overall improvement in driver comfort. Where eyewear 50 is fashioned of polycarbonate materials, a desirable blocking of ultra-violet (U.V.) radiation is realized to provide enhanced wearer protection.

Since certain changes may be made in the above-described method, system and appartus without departing from the scope of the invention herein involved, it is intended that all matter contained in the description thereof or shown in the accompanying drawings shall be intrepreted as illustrative and not in a limiting sense.

We claim:

1. A method for reducing asthenopia of a subject observing a luminescent display of predetermined spectral characteristic located an operative distance from the eyes of said subject and within an environment of overhead illumination comprising the steps of:

placing eyewear over the eyes of said subject;

said eyewear having a clear optical region of area extent for intercepting lines of sight substantially only below the forwardly looking mid pupillary location of said eyes, said clear optical region having a tint selected for transmitting said predetermined spectral characteristic of said display while reducing the effects of chromatic aberration at the eyes of said subject; and said eyewear further having a translucent region having light diffusing characteristics extending substantially upwardly from said forwardly looking mid pupillary location, intercepting and blocking lines of sight therefrom and configured for intercepting and scattering light within the superior field of view of said eyes to an extent wherein a reduction in the luminance difference perceived by said subject with respect to said overhead illumination and said display is substantially reduced, said light diffusing characteristics being sufficient to average out flicker effects and providing a sufficient diffuse luminance effect to avoid a "blinder" feeling.

2. The method of claim 1 in which said clear optical region tint is selected from the yellow visible spectrum.

3. A method for enhancing the concentration of a student observing reading material within a school environment such student observing a display located an operative distance from the eyes thereof and within an environment of overhead illumination, comprising the steps of:

placing eyewear over the eyes of said student;

said eyewear having a clear optical region of area extent for intercepting lines of sight substantially only below and only forwardly of the mid pupillary location of said eyes and a translucent region having light diffusing characteristics extending substantially upwardly from said pupillary location for all forwardly disposed lines of sight and configured for intercepting light within the superior field of view of said eyes for said forward lines of sight and substantially intercepting light within both the superior and inferior field of view of said eye positions for all lines of sight constituting peripheral vision, said light diffusing characteristics being sufficient to average out flicker effects and providing a sufficient diffuse luminance effect to avoid a "blinder" feeling.

4. A method for improving the vision of a person subjected to conditions of vision-impairing sunlight, which comprises:

placing eyewear over the eyes of said person;

said eyewear having a clear optical region of area extent for intercepting lines of sight substantially only below the forwardly looking mid pupillary location of said eyes, and a translucent region having light diffusing characteristics extending substantially upwardly from said forwardly looking mid pupillary location and configured for intercepting light within the superior field of view of said eyes, said clear optical region being provided as an optical filter, the pigmentation of which is selected for providing a predetermined transmission reduction said translucent region intercepting and blocking lines of sight therethrough within said superior field of view to an extent effective to reduce veiling luminance at the retinas of the eyes of said person, said light diffusing characteristics being sufficient to average out flicker effects and providing a sufficient diffuse luminance effect to avoid a "blinder" feeling.

5. Eyewear for use by a subject in viewing an object situated within an environment of overhead, glare inducing illumination, comprising:

a forward frame portion having a centrally disposed bridge section and right and left temple pieces extending therefrom, said frame portion being locatable upon he head of said subject before the position of the eyes thereof;

said frame portion supporting clear optical regions dimensioned for intercepting lines of sight substantially only within the inferior field of view of said eyes;

said frame portion supporting a translucent region having light diffusing characteristics intercepting and blocking lines of sight directed substantially upwardly from the forwardly looking mid pupillary position of said eyes within the superior field of view thereof;

the extent of translucency of said translucent region being sufficient to substantially reduce the luminance value difference otherwise perceived by said subject between said overhead illumination and illumination within said subject's inferior field of view; and said clear optical region being pigmented to define an optical filter of predetermined transmittance, said light diffusing characteristics being sufficient to average out flicker effects and providing a sufficient diffuse luminance effect to avoid a "blinder" feeling.

6. The eyewear of claim 5 wherein the extent of said translucency at said translucent region is selected as effective to reduce veiling luminance at the retinas of the eyes of said subject derived from said overhead illumination and for effecting an elevation of the contrast value of images of said object at said retinas.

7. The eyewear of claim 5 in which:

said object exhibits information as illuminated regions exhibiting a predetermined predominant wavelength band of light in the visible spectrum; and said pigmentation is selected to transmit said predetermined predominant wavelength band of light while suppressing wavelength bands of the visible spectrum remote from said predetermined band in an amount effective to reduce the extent of chromatic aberration in the image perceived at said subject's eyes.

8. The eyewear of claim 5 including right and left translucent side shields having light diffusing characteristics extending rearwardly of said forward frame portion, supported by respective said right and left temple pieces and configured for occluding peripherial vision within said superior field of view.

9. The eyewear of claim 5 in which said translucent region is configured having a linear, substantially horizontal border with said clear region and extending substantially across said forwardly loading mid pupillary position.

10. The eyewear of claim 5 in which said optical region pigmentation is selected from the yellow region of the visible spectrum.

11. The eyewear of claim 8 in which each said right and left side shields are configured having a translucent region having light diffusing characteristics extending upwardly for a substantially horizontal border, and a clear region extending from said translucent region, said right and left side shield borders being substantially coplanar with said frame portion linear border.

* * * * *